United States Patent
Esser

[11] Patent Number: 6,086,109
[45] Date of Patent: Jul. 11, 2000

[54] CONVEYING PIPE

[75] Inventor: Alexander Esser, Warstein, Germany

[73] Assignee: Esser-Werke GmbH & Co., KG, Warstein, Germany

[21] Appl. No.: 09/133,528

[22] Filed: Aug. 13, 1998

[30] Foreign Application Priority Data

Aug. 14, 1997 [DE] Germany .................. 197 35 335

[51] Int. Cl.[7] .................................................. F16L 55/18
[52] U.S. Cl. ........................ 285/16; 285/55; 285/112; 285/288.1; 285/416; 285/906
[58] Field of Search .................. 285/15, 16, 416, 285/17, 112; 406/193

[56] References Cited

U.S. PATENT DOCUMENTS

| | | | |
|---|---|---|---|
| 1,138,375 | 5/1915 | Griffin | 285/16 |
| 2,451,587 | 10/1948 | Taylor | 285/112 |
| 4,484,771 | 11/1984 | Schulz | 285/416 X |
| 5,044,670 | 9/1991 | Esser | 286/16 |
| 5,188,396 | 2/1993 | Calvin | 285/16 |
| 5,275,440 | 1/1994 | Esser | 285/16 |

FOREIGN PATENT DOCUMENTS

| | | | |
|---|---|---|---|
| 972208 | 1/1951 | France | 285/354 |
| 1507493 | 12/1967 | France | 285/416 |

*Primary Examiner*—Dave W. Arola
*Attorney, Agent, or Firm*—Friedrich Kueffner

[57] ABSTRACT

A conveying pipe for hydraulically transporting solids, such as sand, gravel or also concrete is composed of a straight or curved pipe portion and of coupling flanges at the ends of the pipe portion, wherein the coupling flanges protrude radially above the outer surface of the pipe portion. The outer end faces of the coupling flanges which face away from each other are each located in the transverse planes of the end faces of the conveying pipe. The coupling flange located at the end of the conveying pipe on the inlet side has a greater width than the coupling flange arranged at the end on the outlet side.

8 Claims, 3 Drawing Sheets

CONVEYING PIPE

BACKGROUND OF THE INVENTION

1. Field of the Invention

The present invention relates to a conveying pipe for hydraulically transporting solids, such as sand, gravel or also concrete.

2. Description of the Related Art

Conveying pipes of the above-described type are subjected to significant internal wear because of the abrasive solids. Consequently, the pipes must be replaced relatively frequently. The intensity of the wear depends on the position of each conveying pipe in the entire pipeline and the intensity of the wear is dependent on whether it is a straight pipe or a curved pipe. To ensure that each conveying pipe can be removed transversely out of the pipeline and can also be inserted again transversely into the pipeline, each conveying pipe is composed of a straight or curved pipe portion and of coupling flanges at the ends of the pipe portion, wherein the coupling flanges protrude radially above the outer surface of the pipe portion. The outer end faces of the coupling flanges which face away from each other are each located in the transverse planes of the end faces of the conveying pipe.

The fluid-tight connection of two successive conveying pipes is effected by coupling rings composed of two shells which are placed around the coupling flanges and are clamped. Sealing elements can additionally be embedded in the inner sides of the coupling rings. In order to make the conveying pipes of different manufacturers exchangeable, an international agreement provides that the total width of two coupling flanges to be connected to each other including a coupling gap existing between the coupling flanges or between two successive conveying pipes are specified in dependence on the respective inner diameter of the conveying pipes. In this connection, the radial extension of the coupling flanges is also prescribed, so that coupling rings of one manufacturer can be coupled without problems to conveying pipes of different manufacturers.

Moreover, it is indisputable that when using conveying pipes for hydraulically transporting solids that the wear at the inlet end of a conveying pipe is greater than in the area following in the conveying direction. As a result of this wear, the inner end of the conveying pipe on the inlet side widens more and more in a conical or trumpet-like shape and travels on in the conveying direction until the wall thickness between the inner conical portion and the transition from the inner end face of the coupling flange and the adjacent outer surface of the conveying pipe becomes so thin that there is the danger that the coupling flange tears off. However, the pipe portion is still fully useful over the greatest portion of its length. Nevertheless, the conveying pipe has to be completely replaced.

SUMMARY OF THE INVENTION

Therefore, it is the primary object of the present invention to provide a conveying pipe of the above-described type in which the end portions of the conveying pipe are constructed for the hydraulic transportation of solids in such a way that especially the wear resistance of the end portion on the inlet side approximately corresponds to the wear resistance of the portion following in the conveying direction.

In accordance with the present invention, the coupling flange located at the end of the conveying pipe on the inlet side has a greater width than the coupling flange arranged at the end on the outlet side.

Consequently, while observing the international agreement concerning the total width of two coupling flanges to be connected to each other and taking into consideration the coupling gap, the present invention provides the coupling flange on the entry side with a greater wear volume than the coupling flange on the exit side. Wear volume is the volume of the material being removed from the pipe as a result of wear. In this manner, the unavoidable wear on the entry side of a conveying pipe can continue over a significantly longer period of time than in the past before the conically-shaped wear zone travelling in the conveying direction reaches the transition area from the inner end face of the wide coupling flange to the adjacent outer surface of the conveying pipe so closely that there is the danger that the coupling flange tears off and the conveying pipe must be replaced.

The ratio of the width of the wide coupling flange to the narrow coupling flange is approximately 1.7 to 1.3:1, preferably about 1.5:1.

The present invention can be applied with the same advantage in straight conveying pipes as well as in curved conveying pipes.

When assembling the conveying pipes it is merely necessary to make sure that a narrow coupling flange must be connected to a wide coupling flange. This also determines the conveying direction. Even if it should happen during the assembly that the narrow coupling of two conveying pipes are accidentally connected, this mistake becomes immediately apparent when the next conveying pipe is to be connected. The incorrect assembly can then be corrected without problems.

In the simplest case, the two coupling flanges of a conveying pipe each form an integrally connected component of welding flange portions. These welding flange portions are butt-welded through axially extending annular portions to the end faces of a single-layer pipe portion. In this embodiment, the pipe portion as well as the welding flange portions at the ends of the conveying pipe may be of the steel quality St 52.

In this simple embodiment, it is advantageous if the wall thickness of the annular portion corresponds to the wall thickness of the pipe portion. In this manner, each conveying pipe has over its entire length an inner surface without projections. The outer surface between the two coupling flanges is also without projections.

The basic concept according to the present invention further makes it possible that the end of a conveying pipe at the exit side is of significantly simpler construction than the end on the entry side which is subjected to much greater wear.

In this connection, an advantageous embodiment of the present invention provides that the wide coupling flange is an integrally connected component of a sleeve provided with a circumferential coupling groove, wherein the sleeve extends with its end facing away from the coupling flange over the entry end of the single-layer pipe portion and is welded through its inner end face to the outer surface of the pipe portion, wherein a wear ring is embedded in the sleeve between the end face of the pipe portion on the entry side and the transverse plane extending through the outer end face of the conveying pipe, wherein the wear ring is of a material having a greater resistance to wear than the material of the pipe portion, while the narrow coupling flange is butt-welded as an integrally connected component of a welding flange portion through an axially extending annular portion to the end face of the pipe portion on the entry side.

The welding flange portion on the exit side as well as the welding flange portion on the entry side of the pipe may be of the steel quality St 52. The connection between the sleeve and the pipe portion is effected through a fillet seam between the inner end face of the sleeve and the outer surface of the pipe portion. The wear ring is embedded on the inner side of the sleeve.

In accordance with another feature of the present invention, the wall thickness of the wear ring is equal to the wall thickness of the pipe portion. If necessary, the wall thickness of the wear ring may also be greater. In that case, the inner diameter of the wear ring is preferably smaller than the inner diameter of the pipe portion.

The wall thickness of the annular portion of the welding flange portion corresponds to the wall thickness of the pipe portion.

If the conveying pipes have double layers, wherein the inner layer has a greater wear resistance than the outer layer, it is advantageous to use an embodiment of the present invention in which both coupling flanges are integrally connected components of sleeves provided with circumferential coupling grooves. These sleeves may be composed of simple steel of the quality St 52, as is the case in the outer layer of the pipe portion. The sleeve with the narrow coupling flange provided at the exit side of the conveying pipe extends with its entire length over the end of the double-layer pipe portion. The outer end face of this sleeve extends in the transverse plane of the end face of the conveying pipe on the exit side, i.e., also in the end face of the pipe portion on the exit side. The inner end face of the sleeve is welded through a fillet seam to the outer surface of the outer layer of the pipe portion.

The sleeve on the inlet side provided with the wide coupling flange engages with its end facing away from the coupling flange over the end of the pipe portion on the inlet side. This sleeve may also be of the steel quality St 52. The connection is effected through a welding seam between the inner end face of the sleeve and the outer surface of the outer layer of the pipe portion. A wear ring whose wear resistance is greater than the wear resistance of the inner layer of the pipe portion is mounted between the end face of the pipe portion on the entry side and the transverse plane extending through the end face of the conveying pipe on the entry side.

It is conceivable that the wall thickness of the wear ring corresponds to the wall thickness of the double-layer pipe portion. However, the wall thickness of the wear ring may also be greater than the wall thickness of the pipe portion. In particular, the inner diameter of the wear ring is smaller than the inner diameter of the inner layer.

In certain cases of application it may be necessary to provide inner wear rings at both ends of the conveying pipe, wherein the wear resistance of the wear rings is greater than the wear resistance of the inner layer of the pipe portion. In that case, the wear rings are mounted between the end face of the pipe portion on the entry side and the transverse plane extending through the outer end face of the conveying pipe or between the end face of the pipe portion on the exit side and the transverse plane extending through the end face of the conveying pipe on the exit side. As is the case of the outer layer of the pipe portion, the sleeves may preferably be of the steel quality St 52.

The wall thickness of the wear rings may correspond to the wall thickness of the double-layer pipe portion. However, in accordance with another feature, it is also conceivable that the wall thickness of the wear rings is greater than the wall thickness of the pipe portion. The inner diameter of the wear rings is preferably smaller than the inner diameter of the pipe portion.

An even greater wear resistance at the entry side of a straight or bent conveying pipe is achieved by an embodiment in which a sleeve with a circumferential coupling groove and a narrow coupling flange engages at the exit side with its entire length over the end of the pipe portion on the exit side. As is the case of the outer layer of the pipe portion, the sleeve may also be of the steel quality St 52. The outer end face of the sleeve is located in the transverse plane of the end face of the conveying pipe on the exit side, i.e., also in the transverse plane of the end face of the pipe portion. The sleeve is secured by means of a fillet seam between the inner end face of the sleeve and the outer surface of the outer layer of the pipe portion. However, it is also conceivable that a sleeve extends only with its end facing away from the coupling flange over the end of the pipe portion on the exit side and a wear ring is embedded between the end face of the pipe portion on the exit side and the transverse plane extending through the end face of the conveying pipe on the exit side.

For increasing the wear resistance, an outer wear ring is embedded in an inner circumferential groove of the wide coupling flange on the inlet side. An additional inner wear ring extends in a sleeve provided with a circumferential coupling groove between this outer wear ring and the end face of the pipe portion on the entry side, wherein the sleeve is welded with a fillet seam through its inner end face to the outer surface of the outer layer of the pipe portion. The sleeve may be of the steel quality St 52. The wear resistance of the inner wear ring is greater than the wear resistance of the inner layer of the pipe portion, but smaller than the wear resistance of the outer wear ring. It is also possible that the inner diameter of the outer wear ring is smaller than the inner diameter of the inner wear ring and the inner diameter of the inner wear ring, in turn, is smaller than the inner diameter of the inner layer of the pipe portion.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
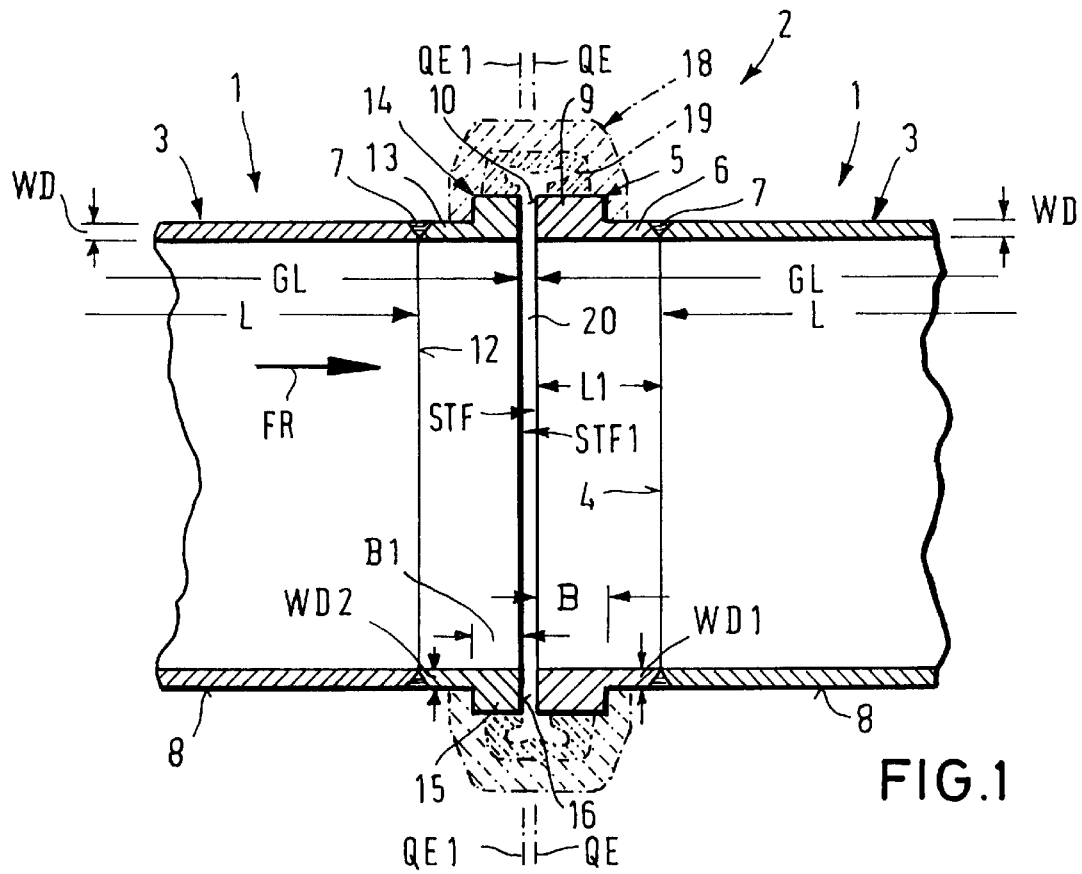
FIGS. 1 to 5 are vertical longitudinal sectional views of the coupling area between two components of identical conveying pipes forming a pipeline for hydraulically transporting solids, wherein each figure of the drawing shows a different embodiment of the present invention.

FIG. 1 of the drawing shows a conveying pipe 1 for hydraulically transporting solids which is connected to additional conveying pipes 1 to form a continuous pipeline 2. The conveying direction is indicated by arrow FR.

Each conveying pipe 1 has a single-layer pipe portion 3 which is shorter than the total length GL of the pipe 1. The pipe portion 3 is of the steel quality St 52. The wall thickness WD of the pipe portion 3 is identical over the length L of the pipe portion 3.

A welding flange portion 5 of the steel quality St 52 is butt-welded with an axially directed annular portion 6 to the end face 4 of the pipe portion 3 on the entry side. The connection is effected through a V-groove seam 7. The wall thickness WD1 of the annular portion 6 corresponds to the wall thickness WD of the pipe portion 3.

The welding flange portion 5 additionally has a coupling flange 9 which has a rectangular cross-section and protrudes radially above the outer surface 8 of the pipe portion 3. The outer end face 10 of the coupling flange 9 extends in the transverse plane QE—QE through the end face STF of the conveying pipe 1 on the entry side. The width B of the coupling flange 9 is approximately equal to half the length L1 of the welding flange portion 5.

A welding flange portion 14 of the steel quality St 52 is connected, also through an axially directed annular portion 13, to the end face 12 of the pipe portion 3 on the exit side by means of a V-groove seam 7. The wall thickness WD2 of the annular portion 13 corresponds to the wall thickness WD of the pipe portion 3. This welding flange portion 14 also has a coupling flange 15 which has a rectangular cross-section and protrudes radially above the outer surface 8 of the pipe portion 3, wherein the outer end face 16 of the coupling flange 15 extends in the transverse plane QE1—QE1 in which the end face STF1 of the conveying pipe 1 on the exit side also extends.

It is apparent that the width B of the coupling flange 9 at the entry end of the conveying pipe 1 is greater than the width B1 of the coupling flange 15 provided at the exit end. In this embodiment, the ratio of the width B of the coupling flange 9 to the width B1 of the coupling flange 15 is 1.5:1.

Illustrated in less solid lines is how two conveying pipes 1 are connected in a fluid-tight manner while leaving a coupling gap 20 by means of a coupling ring 18 composed of two shells and having inner sealing elements 19.

The conveying pipe 1a in accordance with the embodiment shown in FIG. 2 once again includes a single-layer pipe portion 3a of the steel quality St 52 whose length L is shorter than the total length GL of the conveying pipe 3a.

The inner end 22 of a sleeve 23 of the steel quality St 52 provided with a circumferential coupling groove 24 engages over the end 21 of the pipe portion 3a on the entry side. The sleeve 23 is welded by means of a fillet seam 25 through its inner end face 26 to the outer surface 8a of the pipe portion 3a. A wear ring 28 whose wear resistance is greater than the wear resistance of the pipe portion 3a is mounted between the end face 4a of the pipe portion 3a on the entry side and the transverse plane QE—QE extending through the end face STF of the conveying pipe 1a on the entry side in which the outer end face 27 of the sleeve 23 also extends. The wall thickness WD3 of the wear ring 28 corresponds to the wall thickness WD of the pipe portion 3a. Adjacent the welding ring 29 the sleeve 23 has a coupling 9a whose width B3 corresponds approximately to half the length L2 of the wear ring 28.

A welding flange portion 14 of the steel quality St 52 and of the type illustrated in FIG. 1 is connected to the end face 12a of the pipe portion 3a on the exit side through an axially directed annular portion 13 and a V-groove seam 7. The welding flange portion 14 has a radially extending coupling flange 15 whose width B1 is smaller than the width B3 of the coupling 9a provided on the sleeve 23. The wall thickness WD2 of the annular portion 13 corresponds to the wall thickness WD of the pipe portion 3a.

Figure 2:
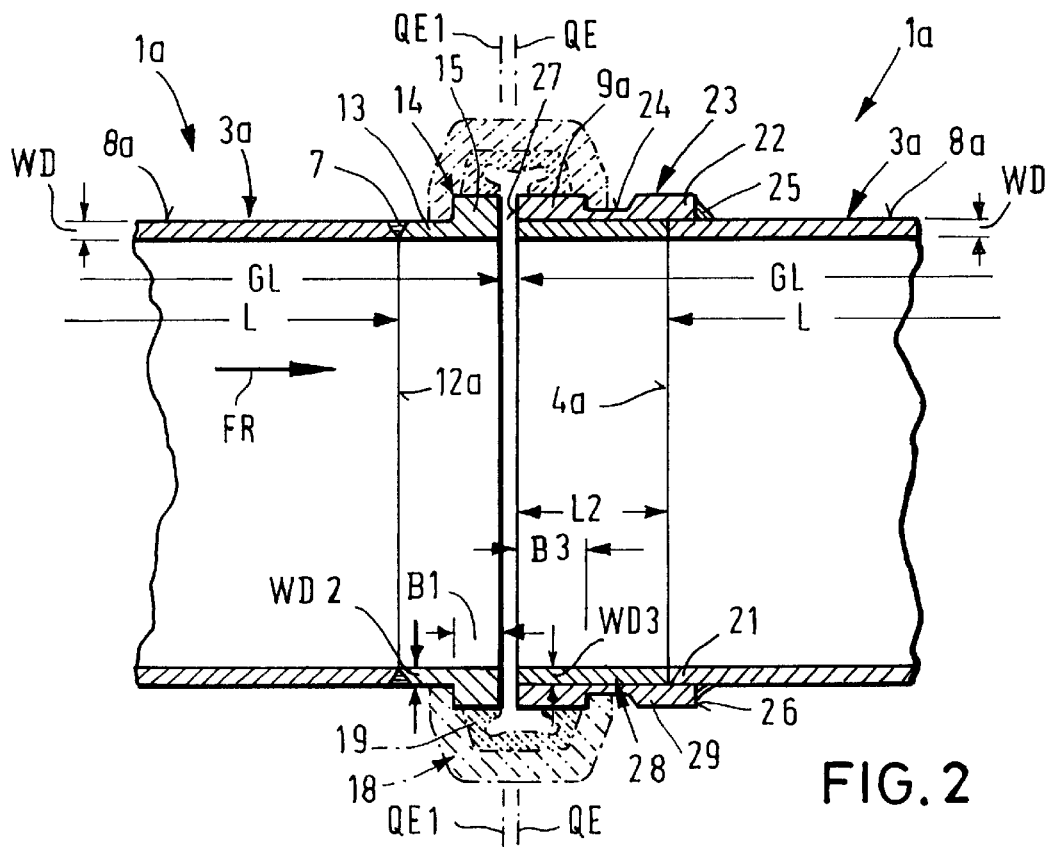

In the illustration of FIG. 2, shown in less solid lines is the connection between two conveying pipes 1a by means of a coupling ring 18 composed of two shells and inner sealing elements 19. The conveying direction is indicated by FR.

Figure 3:
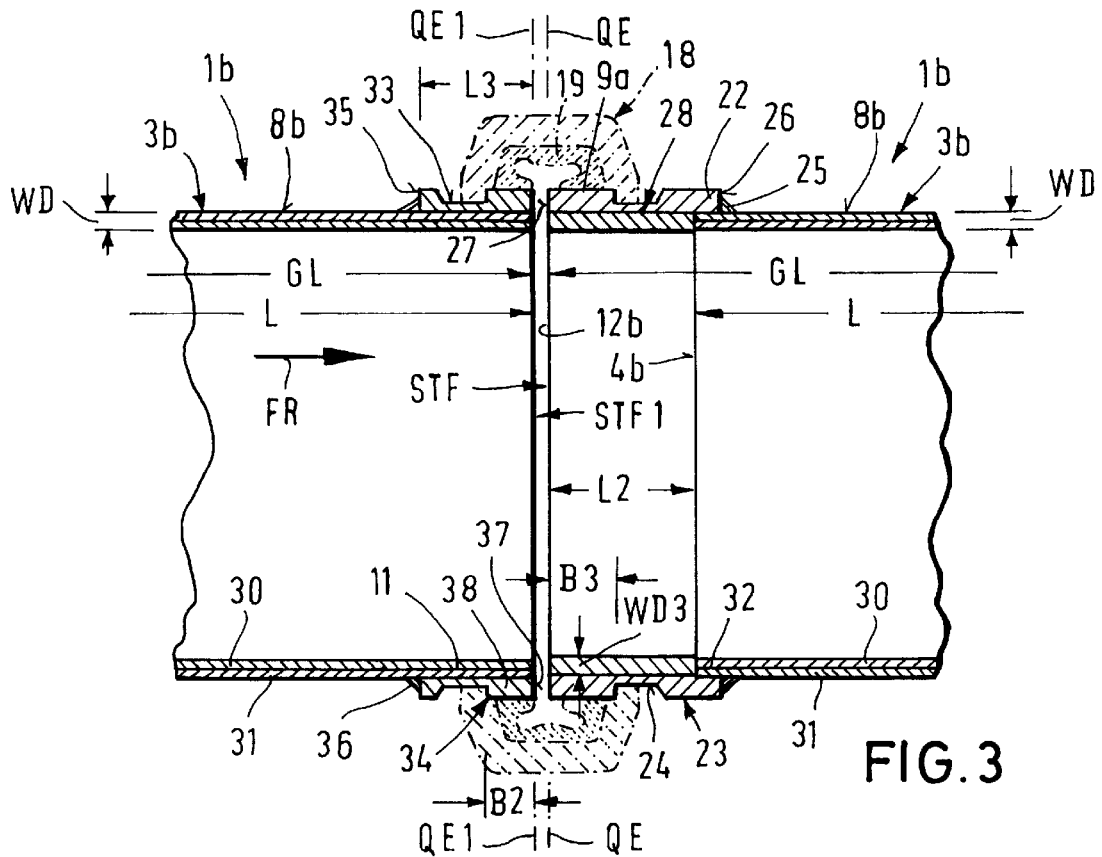

In the embodiment according to FIG. 3, the conveying pipes 1b each have double-layer pipe portions 3b. Also in this case, the length L of each pipe portion 3b is shorter than the total GL of a conveying pipe 1b.

The inner layer 30 of each pipe portion 3b has a greater wear resistance than the outer layer 31.

A sleeve 23 having the steel quality St 52 and provided with a circumferential groove 24 engages over the end 22 of each pipe portion 3b on the entry side. This corresponds to the embodiment of FIG. 2. The sleeve 23 is welded by means of a fillet seam 25 through its inner end face 26 to the outer surface 8b of the outer layer 31. A wear ring 28 whose wear resistance is greater than the wear resistance of the inner layer 30 of the pipe portion 3b is mounted between the end face 4b of the pipe portion 3b on the entry side and the transverse plane QE—QE of the conveying pipe 1b extending through the outer end face 27 of the sleeve 23. The wall thickness WD3 of the wear ring 28 is greater than the wall thickness WD of the pipe portion 3b.

The sleeve 23 further is provided with a coupling flange 9a which is rectangular in cross-section and whose width B3 corresponds approximately to half the length L2 of the wear ring 28.

A sleeve 34 of the steel quality St 52 and provided with a circumferential coupling groove 33 engages with its entire length L3 over the end 11 of the pipe portion 3b on the exit side. The inner end face 35 of the sleeve 34 is welded through a fillet seam 36 to the outer surface 8b of the outer layer 31 of the pipe portion 3b. The outer end face 37 of the sleeve 34 extends in the transverse plane QE1—QE1 which extends through the end face STF1 of the conveying pipe 1b on the exit side.

The width B2 of the rectangular coupling flange 38 located next to the coupling 33 of the sleeve 34 is smaller than the width B3 of the coupling flange 9a of the sleeve 23 on the entry side. Both coupling flanges 9a, 38 are surrounded by a coupling ring 18 composed of two shells and with inner sealing elements 19 and are connected to each other by means of the coupling ring 18.

The conveying direction is indicated by FR.

Figure 4:
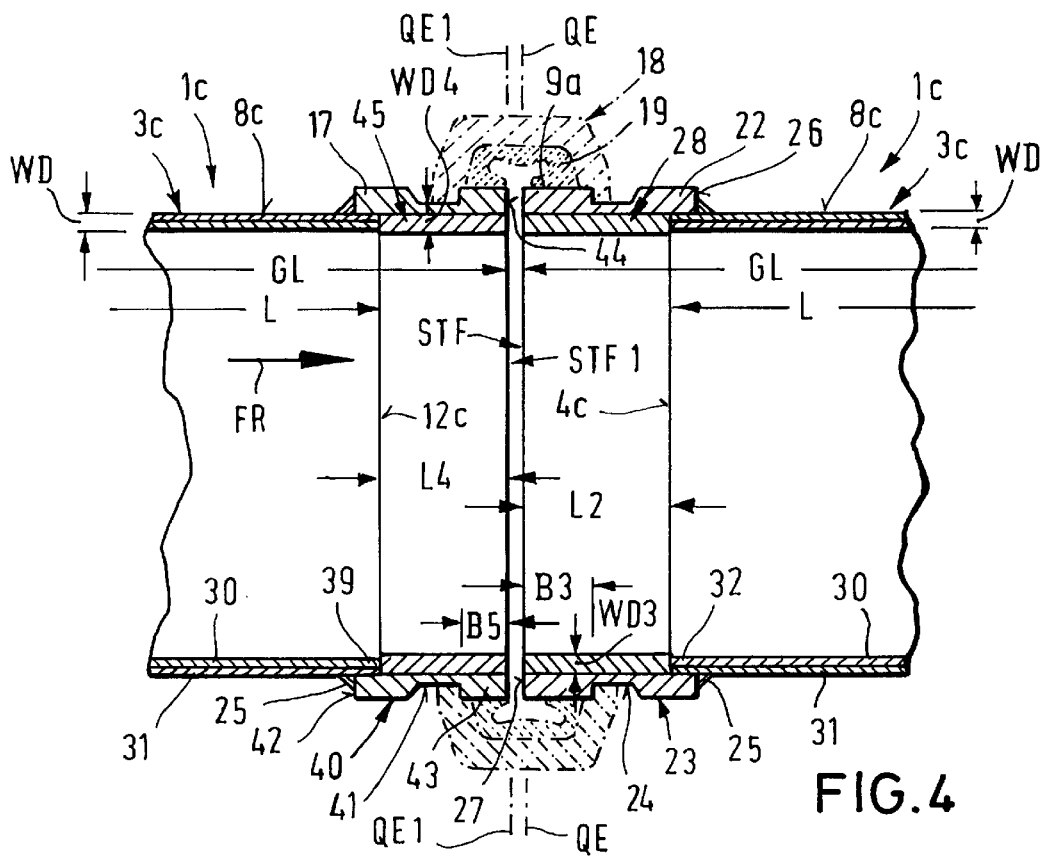

In the embodiment illustrated in FIG. 4, the conveying pipes 1c also have double-layer pipe portions 3c with an inner layer 30 which has a greater wear resistance than the outer layer 31. The length L of the pipe portions 3c is shorter than the total length GL of the conveying pipes 1c.

In the embodiment of FIG. 4, sleeves 23 and 40 of the steel quality St 52 and provided with circumferential coupling grooves 24 and 41, respectively, engage over the end 32 of the pipe portion 3c on the entry side as well as over the end 39 of the pipe portion 3c on the exit side. The inner end faces 26 and 42, respectively, of the sleeves 23, 40 are welded through fillet seams 25 to the outer surface 8c of the outer layer 31 of the pipe portion 3c. Each sleeve 23, 40 has a coupling flange 9a, 43 provided with a rectangular cross-section, wherein the width B3 of the coupling flange 9a on the entry side is greater than the width B5 of the coupling flange 43 on the exit side.

A wear ring 28 whose resistance to wear is greater than the resistance to wear of the inner layer 30 of the pipe portion 3c is mounted between the end face 4c of the pipe portion 3c on the entry side and the transverse QE—QE extending through the outer end face 27 of the sleeve 23 on the entry side or the end face STF of the conveying pipe 1c on the entry side. The wall thickness WD3 of the wear ring 28 is greater than the wall thickness WD of the pipe portion 3c.

A wear ring 45 whose resistance to wear is greater than the wear resistance of the inner layer 30 of the pipe portion 3c is also mounted between the end face 12c of the pipe portion 3c on the exit side and the transverse plane QE1—QE1 extending through the outer end face 44 of the sleeve 40 on the exit side or the end face STF1 of the conveying pipe 1c on the exit side. The wall thickness WD4 of the wear ring 45 is greater than the wall thickness WD of the pipe portion 3c.

While the width B3 of the coupling flange 9a provided on the sleeve 23 on the entry side corresponds approximately to half the length L2 of the wear ring 28 at this location, the width B5 of the coupling flange 43 provided on the sleeve 40 on the exit side is smaller than half the length L4 of the wear ring 45.

Both coupling flanges 9a, 43 are surrounded by a coupling ring 18 composed of two shells and provided with inner sealing elements 19.

The conveying direction is indicated by FR.

Figure 5:
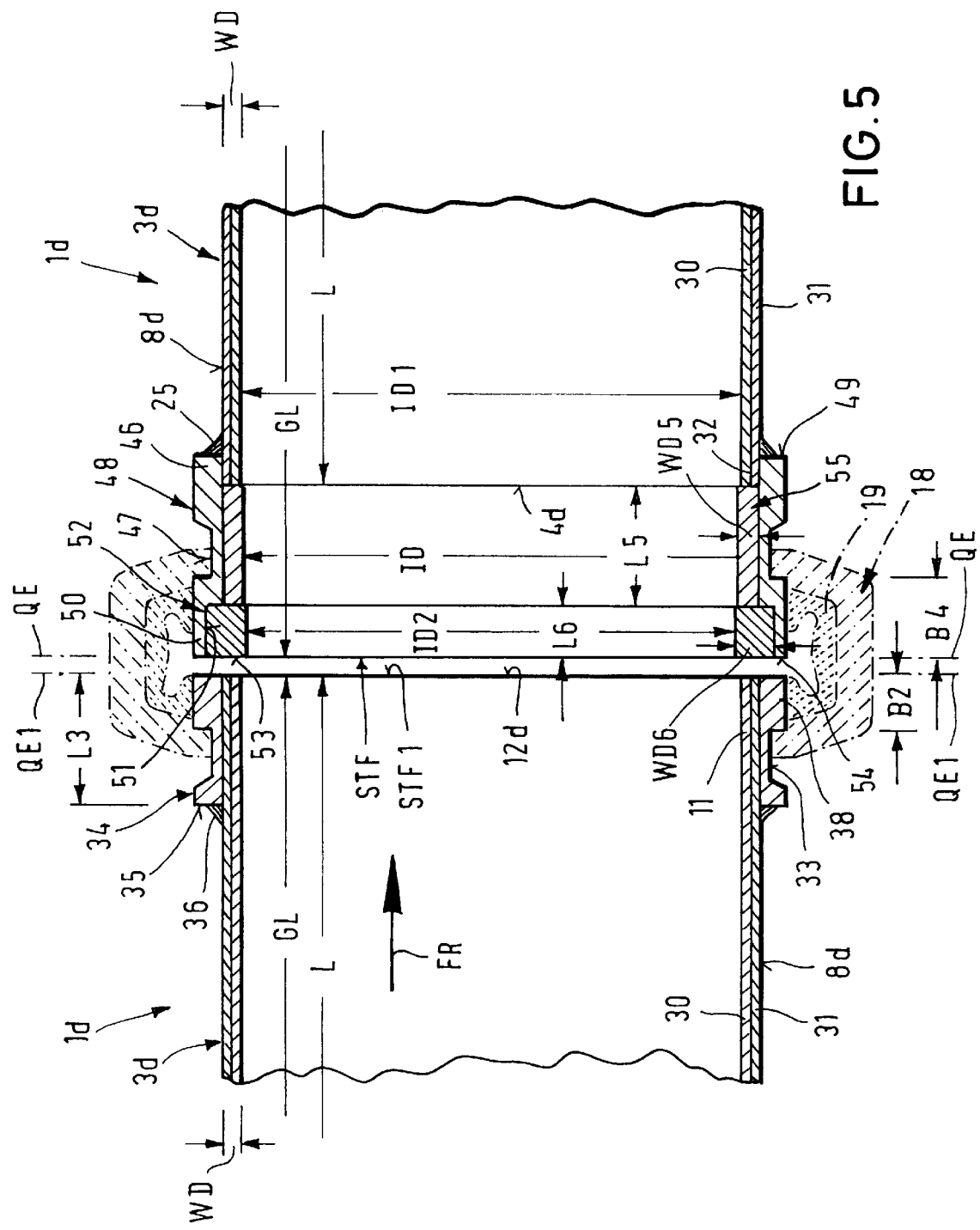

In the embodiment of FIG. 5, the conveying pipes 1d again have double-layer pipe portions 3d. The length L of each pipe portion 3d is shorter than the total length GL of a conveying pipe 1d. The inner layer 30 of each pipe portion 3d has a greater resistance to wear than the outer layer 31.

The inner end 46 of a sleeve 48 of the steel quality St 52 and provided with a circumferential groove 47 engages over the end 32 of a pipe portion 3d on the entry side. The connection between the sleeve 48 and the pipe portion 3d is effected through a fillet seam 25 between the inner end face 49 and the outer surface 8d of the outer layer 31 of the pipe portion 3d.

The sleeve 48 has a coupling flange 50 having a rectangular cross-section adjacent the coupling groove 47. An outer wear ring 52 having a rectangular cross-section is embedded in an inner circumferential groove 51 of the coupling flange 50. The outer end face 53 of the outer wear ring 52 extends in the transverse plane QE—QE extending through the outer end face 54 of the sleeve 48 or in the end face STF of the conveying pipe 1d on the entry side. An inner wear ring 55 is mounted between the outer wear ring 52 and the end face 4d of the pipe portion 3d on the entry side. The wear resistance of the inner wear ring 55 is greater than the wear resistance of the inner layer 30 of the pipe portion 3d, but smaller than the wear resistance of the outer wear ring 52. It can also be seen that the inner diameter ID of the inner wear ring 55 is smaller than the inner diameter ID1 of the inner layer 30 of the pipe portion 3d, but greater than the inner diameter ID2 of the outer wear ring 52. The width B4 of the coupling flange 50 corresponds approximately to the length L5 of the inner wear ring 55 plus the length L6 of the outer wear ring 52.

A sleeve 34 of the steel quality St 52 engages over the end 11 of the pipe 3d on the exit side, wherein the sleeve 34 extends over the end 11 with its entire length L3 from the end face 12d of the pipe portion 3d on the exit side or from the transverse plane QE1—QE1 extending through the end face StF1 of the conveying pipe 1d on the exit side, as also shown in FIG. 3. The inner end face 35 of the sleeve 34 is welded through a fillet seam 36 to the outer surface 8d of the outer layer 31 of the pipe portion 3d.

A coupling flange 38 having a rectangular cross-section extends adjacent a circumferential coupling groove 33 of the sleeve 34. The width B2 of the coupling sleeve 38 is smaller than the width B4 of the coupling flange 50 on the entry side.

The coupling flanges 38 and 50 are surrounded by a coupling ring 18 composed of two shells and provided with sealing elements 19.

The conveying direction is indicated by FR.

While specific embodiments of the invention have been shown and described in detail to illustrate the inventive principles, it will be understood that the invention may be embodied otherwise without departing from such principles.

I claim:

1. A conveying pipe for hydraulically transporting solids, the conveying pipe having a total length and a first end at an entry side and a second end at an exit side, the ends having end faces, the conveying pipe comprising a pipe portion having a length shorter than the total length of the conveying pipe, the pipe portion having an outer surface, further comprising a first coupling flange connected to an end of the pipe portion at the entry side and a second coupling flange connected to an end of the pipe portion at the exit side, the coupling flanges protruding radially beyond the outer surface of the pipe portion, wherein the coupling flanges have end faces, wherein the end face of each coupling flange extends in a transverse plane with the end face of the conveying pipe, wherein the first coupling flange has a greater width in an axial direction thereof than the second coupling flange, wherein the first coupling flange is an integrally connected component of a sleeve having a circumferential coupling groove, the sleeve having an end facing away from the first coupling flange and engaging over the first end of the pipe portion, the sleeve having an inner end face welded to the outer surface of the pipe portion, the pipe portion being composed of a single layer, a wear ring of a material having a greater resistance to wear than a material of the pipe portion being embedded in the sleeve between an end face of the pipe portion on an entry side thereof and a transverse plane extending through the end face of the conveying pipe at the first end thereof, and wherein the second coupling flange is an integrally connected component of a welding flange portion having an axially extending annular portion, the annular portion being butt-welded to an end face of the pipe portion at an exit side thereof.

2. The conveying pipe according to claim 1, wherein the wear ring and the pipe portion each have a wall thickness, and wherein the wall thickness of the wear ring corresponds to the wall thickness of the pipe portion.

3. The conveying pipe according to claim 2, wherein the annular portion has a wall thickness, and wherein the wall thickness of the annular portion corresponds to the wall thickness of the pipe portion.

4. A conveying pipe for hydraulically transporting solids, the conveying pipe having a total length and a first end at an entry side and a second end at an exit side, the ends having end faces, the conveying pipe comprising a pipe portion having a length shorter than the total length of the conveying pipe, the pipe portion having an outer surface, further comprising a first coupling flange connected to an end of the pipe portion at the entry side and a second coupling flange connected to an end of the pipe portion at the exit side, the coupling flanges protruding radially beyond the outer surface of the pipe portion, wherein the coupling flanges have end faces, wherein the end face of each coupling flange extends in a transverse plane with the end face of the conveying pipe, wherein the first coupling flange has a greater width in an axial direction thereof than the second coupling flange, wherein both coupling flanges are integrally connected components of sleeves having circumferential coupling grooves, the pipe portion being comprised of two layers, wherein the sleeve with the second coupling flange extends with a total length thereof over an end of the pipe portion at an exit side thereof, and wherein an inner end face of the sleeve with the second coupling flange is welded to the outer surface of the pipe portion, and wherein the sleeve with the first coupling flange extends with an end facing away from the coupling flange over an end of the pipe section at an entry side thereof and is welded through an inner end face thereof to the outer surface of the pipe portion, a wear ring having a greater resistance to wear than a resistance to wear of an inner layer of the pipe portion being embedded in the sleeve with the first coupling flange between a transverse plane extending through an outer end face of the conveying pipe and an end face of the pipe portion at an entry side thereof.

5. The conveying pipe according to claim 4, wherein the wear ring and the pipe portion each have a wall thickness, and wherein the wall thickness of the wear ring is greater than the wall thickness of the pipe portion.

6. A conveying pipe for hydraulically transporting solids, the conveying pipe having a total length and a first end at an entry side and a second end at an exit side, the ends having end faces, the conveying pipe comprising a pipe portion having a length shorter than the total length of the conveying pipe, the pipe portion having an outer surface, further comprising a first coupling flange connected to an end of the pipe portion at the entry side and a second coupling flange connected to an end of the pipe portion at the exit side, the coupling flanges protruding radially beyond the outer surface of the pipe portion, wherein the coupling flanges have end faces, wherein the end face of each coupling flange extends in a transverse plane with the end face of the conveying pipe, wherein the first coupling flange has a greater width in an axial direction thereof than the second coupling flange, wherein the first and second coupling flanges are each integrally connected components of sleeves having circumferential coupling grooves, the pipe portion being comprised of two layers, each sleeve having ends facing away from the coupling flange and extending over the end of the pipe portion, wherein the sleeves are welded through inner end faces to the outer surface of the pipe portion, a wear ring each having a greater resistance to wear than an inner layer of the pipe portion being embedded in the sleeves between an end face of the pipe portion and a transverse plane extending through the end face of the conveying pipe.

7. The conveying pipe according to claim 6, wherein the wear rings have a wall thickness and the pipe portion has a wall thickness, and wherein the wall thickness of the wear rings is greater than the wall thickness of the pipe portion.

8. A conveying pipe for hydraulically transporting solids, the conveying pipe having a total length and a first end at an entry side and a second end at an exit side, the ends having end faces, the conveying pipe comprising a pipe portion having a length shorter than the total length of the conveying pipe, the pipe portion having an outer surface, further comprising a first coupling flange connected to an end of the pipe portion at the entry side and a second coupling flange connected to an end of the pipe portion at the exit side, the coupling flanges protruding radially beyond the outer surface of the pipe portion, wherein the coupling flanges have end faces, wherein the end face of each coupling flange extends in a transverse plane with the end face of the conveying pipe, wherein the first coupling flange has a greater width in an axial direction thereof than the second coupling flange, wherein the first and second coupling flanges are integrally connected components of sleeves having circumferential coupling grooves, the pipe portion being comprised of two layers, wherein the sleeve with the second coupling flange extends with a total length thereof over an end of the pipe portion at the exit side thereof, and wherein the sleeve with the second coupling flange is welded through an inner end face thereof to the outer surface of the pipe portion, and wherein the sleeve with the first coupling flange engages with an end facing away from the coupling flange over an end of the pipe portion on the entry side thereof and is welded through an inner end face thereof to the outer surface of the pipe portion, an outer wear ring being embedded in an inner circumferential groove of the first coupling flange, and an inner wear ring being mounted between the outer wear ring and an end face of the pipe portion on the entry side thereof, wherein the inner wear ring has a smaller wall thickness than the outer wear ring, and wherein the inner wear ring has a resistance to wear which is smaller than a resistance to wear of the outer wear ring but greater than a resistance to wear of an inner layer of the pipe portion.

* * * * *